United States Patent [19]

McGinniss et al.

[11] 4,163,809

[45] Aug. 7, 1979

[54] RADIATION POLYMERIZATION OF POLYMERIC BINDER COATING COMPOSITIONS

[75] Inventors: Vincent D. McGinniss, Valley City; Vincent W. Ting, Brunswick; Ann F. Kah, Macedonia, all of Ohio

[73] Assignee: SCM Corporation, New York, N.Y.

[21] Appl. No.: 837,855

[22] Filed: Sep. 29, 1977

Related U.S. Application Data

[63] Continuation-in-part of Ser. No. 619,747, Oct. 6, 1975, abandoned.

[51] Int. Cl.$^2$ ............................ B05D 3/06; C08F 8/00
[52] U.S. Cl. ............................ 427/44; 204/159.15; 204/159.16; 427/54; 427/388 A
[58] Field of Search .................. 427/44, 54, 388 A; 204/159.15, 159.16

[56] References Cited

U.S. PATENT DOCUMENTS

| | | | |
|---|---|---|---|
| 3,897,295 | 7/1975 | Dowbenko et al. | 204/195.15 X |
| 3,912,670 | 10/1975 | Huemmer et al. | 204/159.15 X |
| 3,953,309 | 4/1976 | Gilano et al. | 204/159.16 |
| 3,971,834 | 7/1976 | Uzelmeier et al. | 204/159.16 X |
| 3,984,500 | 10/1976 | Dickie et al. | 204/159.16 X |
| 3,992,276 | 11/1976 | Powanda et al. | 204/159.16 |
| 4,072,592 | 2/1978 | Due et al. | 204/159.15 |

*Primary Examiner*—Ronald H. Smith
*Assistant Examiner*—Thurman K. Page
*Attorney, Agent, or Firm*—Thomas M. Schmitz

[57] ABSTRACT

An ultraviolet radiation curable coating composition containing a certain adhesion promotor for adhesion to metal substrates. The ultraviolet curable coating composition comprises an ethylenically unsaturated binder vehicle, about 10% to 40% by weight of a certain high $T_g$ (glass transition temperature) adhesion promotor polymeric additive, and an ultraviolet sensitizer.

3 Claims, No Drawings

RADIATION POLYMERIZATION OF POLYMERIC BINDER COATING COMPOSITIONS

This application is a continuation-in-part of our Ser. No. 619,747 filed Oct. 6, 1975 now abandoned, and is incorporated herein by reference.

BACKGROUND OF THE INVENTION

The present invention is directed generally to radiation curable compositions for use as protective surface coatings on metal substrates. Radiation curable compositions refer to any of those which cures on exposure to a beam of radiation including actinic, ultraviolet or ionizing radiation. The preferred source of radiation energy is ultraviolet (UV) radiation which generally provides useful wavelengths between about 1,600 A and 4,000 A.

One of the major problems experienced with radiation curable coatings applied to metal substrates has been the poor adhesion of cured film to metal surfaces. It has been postulated that the reason for the poor adhesion properties of such coatings is often the rapid and quick curing of the polymeric material accompanied with some film shrinkage such that bonding between the film and the substrate does not occur. Prior to radiation cure, heat cured coating materials showed generally acceptable adhesion properties to metal substrates. In curing the resinous coating composition of the present invention, any source supplying actinic, U.V., or ionizing radiation can be used, although for efficiency and economy, U.V. sources such as electric arc lamps, plasma arc torch (PARS) as described in U.S. Pat. No. 3,364,387 are preferred. Electron beam, when available, can be used also in which case the composition does not have to have a photosensitizer.

A radiation curable coating is suggested in U.S. Pat. No. 3,912,670 wherein a radiation curable oil containing a flow control additive and a reactive solvent-monomer contain acrylic acid. The flow control additive is a thermoplastic polymer having Newtonian flow characteristics and particularly containing no less than 5 to 20 weight percent hydroxyls. The thermoplastic additives must contain hydroxyls so as to provide hydrophilic units on the polymeric additive and impart wetting characteristics of the film to the metal substrate in accordance with well known hydrophilic coating technology for obtaining adhesion. Although the hydroxyl functionality apparently improves adhesion, the thermoplastic nature of the flow control additive causes less than desirable film properties such as poor mar resistance, poor solvent (MEK) resistance, and high viscosity of the coating.

It now has been found that UV and other radiation curable coating compositions cured by light energy and without heat obtain excellent adhesion to metal along with attendant solvent resistant and mar resistant surface coating films by providing a radiation curable composition particularly containing an adhesion promotor additive of a certain high $T_g$ polymeric material having a glass transition temperature ($T_g$) above the ambient application temperature wherein the high $T_g$ polymer contains one ethylenically unsaturated group pendant on a long chain polymer. The high $T_g$ additive avoids the necessity of conventional hydrophilic or hydroxyls groups which tend to diminish cured film integrity properties and is believed to particularly achieve adhesion throughout the long chain polymer structure but substantially improve the film integrity properties by cross-linking the pendant ethylenic double bond with unsaturated double bonds in the ethylenically unsaturated binder polymer.

DETAILED DESCRIPTION OF THE INVENTION

The present invention is directed to a radiation curable coating composition exhibiting excellent adhesive properties comprising the combination of an ethylenically unsaturated polymerizable vehicle and a solid polymer additive having a glass transition temperature (Tg) greater than ambient temperature.

Referring first to the high Tg additive, it is essential that this polymer additive is solid at room temperature and has particularly no cold flow at the operating ambient temperature. The type of the polymer additive is not critical although the physical properties of melting point ($T_m$) or glass transition temperature (Tg) are critical in obtaining adhesion to metal substrates in accordance with this invention. The polymer can be an epoxide, acrylic, a polyester, or a polyurethane provided the high Tg polymer additive is thermosetting and being substantially a linear polymer containing a pendant double bond. Ambient temperature refers to the temperature of the area surrounding the substrate at the time the polymerizable material is subjected to radiation. Thus if the U.V. source utilized comprises lamps of small to moderate wattage, it is likely that little heat is generated and the solid polymer additive can have a Tg as low as 80° F. (27° C.). Although the high Tg polymeric material is a solid in itself at room temperature, the right Tg polymeric material is solubilized in the ethylenically unsaturated polymeric binder to provide a single phase liquid coating composition.

SUMMARY OF THE INVENTION

The radiation curable coating composition comprises an ethylenically unsaturated polymeric binder, 10% to 40% by weight of a high Tg linear polymer containing pendant one ethylenically unsaturated double bond per chain wherein the high Tg polymer has a molecular weight of between 1,000 and 50,000, and at least about 0.5% by weight U.V. sensitizer for preferred U.V. curing.

The high Tg polymer additives are monofunctional linear polymers having one pedant double bond per linear chain. The linear chain portion is substantially a linear polymer chain without significant side chains and has a molecular weight of between about 1,000 and 50,000 and preferably between 1,000 and 3,000. The monofunctional high Tg polymers are distinguished from difunctional high Tg ethylenic polymers which do not provide acceptable adhesion even though the intervening linear polymer is sufficiently long. Similarly, a linear polymer chain considerably less than about 1,000 molecular weight units will likewise provide inadequate adhesion. Further, low Tg materials having a linear chain with a double bond on the other likewise do not provide suitable adhesion even though epoxy groups are well known to provide adhesion to substrates.

The high Tg material does not require hydroxyl groups or other conventional polar hydrophilic groups for obtaining adhesion and in fact must be substantially free of carboxyl groups so as to provide a high Tg polymer with an Acid No. less than 5 and preferably less than zero. Thus, the high Tg polymer is substantially linear and contains one pendant reactive double bond whereby one end of the linear polymer chain will cross-link with the binder and the other end of the linear polymer chain effectively provides adhesion. The high Tg polymer is compatible and soluble within the resinous binder prior to curing but is believed to become incompatible during the curing process whereby the incompatible free end of Tg polymer effectively maintains adhesion to the metal substrate. This mechanism is supported by the fact that such high Tg polymers remain soluble prior to curing and hence wet the metal surface but appears to partially exude to the metal surface and essentially "kick-out" during curing and hence physically adhere to the metal surface due to the solid high Tg nature of the polymer reverting back to solid state after curing. In contrast, low Tg polymers which are liquid at the ambient curing temperature are encapsulated within the cross-linked binder matrix and does not provide adhesion to metal substrates. Thus, the linear high Tg polymer effectively overcomes this adhesion problem by physically griping the metal surface with the linear end of the polymer chain while the double bond of the polymer chain interracts and cross-links with the ethylenically unsaturated binder polymer. Cross-linking the high Tg polymer with the binder polymer avoids the solvent resistance problem caused by thermoplastic materials as well as providing a cross-linking site in the binder for mechanically adhering the film to the substrate. The molecular weight of the high Tg polymer is between about 1,000 and 50,000 which provides an effective linear chain length of between about 50 A and 500 A. The glass transition temperatures for ambient room temperatures cures requires a high Tg polymer with a Tg at least greater than 25° C. and preferably greater than 55° C. to obtain satisfactory adhesion. Accordingly, high Tg polymers for use in this invention preferably have a Tg at least about 20° C. greater than the ambient temperature surrounding the substrate. The high Tg polymeric material itself is substantially free of cold flow and preferably is crystalline polymeric material.

Suitable high Tg polymers can be produced from copolymerized ethylenically unsaturated monomers which are curable by free-radical induced addition polymerization using peroxy or azocatalysts for a redox system by addition polymerization of the ethylenically unsaturated monomers. The polymerized monomers produce an ethylenically unsaturated polymer by the inclusion of an acrylic or a methacrylic acid in the final stage polymerization. Examples of high Tg polymers include polymeric or monomeric materials, or a mixture thereof, especially those exhibiting polymerizable vinyl, acrylic, allylic, mercaptan, fumaric, maleic, having ethylenically unsaturated functionality. Reactive polymers include unsaturated polyesters, acrylics, epoxies, urethanes, silicones, amine, polyamide resins, and particularly acrylated resins such as acrylated silicone oil, acrylated polyester, acrylated urethanes, acrylated polyamides, acrylated soy bean oil, acrylated epoxy resin and acrylated acrylic resin. Examples of reactive ethylenically unsaturated monomers include a variety of acrylates such as hydroxyethyl acrylate, cyclohexyl acrylate, hydroxpropyl acrylate, hydroxyethyl methacrylate, benzyl acrylate, 2-ethylhexyl acrylate, benzeol, phenyloxyethyl acrylate, lower alkoxy ethoxy acrylate, tetrahydro furfuryl acrylate, n-vinyl pyrrolidone vinyl acetate, styrene and substituted styrenes. Examples of ethylenically unsaturated binders include oligomers such as trimethylopropane diacrylate and triacrylate, ethylene glycol diacrylate and dimethacrylate, propoxylated bisphenol A diacrylate and dimethacrylate, and 1,6 hexane diol diacrylate pentaerythitol triacrylate.

The polymerizable vehicle typically constitutes a substantial proportion of the coating composition depending on the extent of pigment incorporated. Basically this vehicle functions as the binder for the pigment and solvates the solid polymer additive. Thus, such vehicle can be a monomer or a mixture of monomers; it can be part or all of an oligomer, prepolymer or a mixture thereof. If need be, the vehicle can be formulated from an oligomer or prepolymer having further polymerizable moiety which can co-polymerize with another monomer, oligomer or prepolymer. Suitable for the purpose of the invention are most ethylenically unsaturated compounds which are polymerizable with the aid of photoinitiators. Representative compounds are reactive vinyl monomers such as the lower alkyl esters of acrylic or methacrylic acid of polymers and prepolymers containing them. Vinyl monomers of particular suitability are methylmethacrylate, ethylmethacrylate, 2-ethylhexyl methacrylate, butylacrylate, isobutyl methacrylate, the correspondong hydroxy acrylates, e.g., hydroxyethylacrylate, hydroxypropylacrylate, also glycol acrylates, e.g., ethylene glycol dimethacrylate, hexamethylene glycol dimethacrylate; the allyl acrylates as are typified by allyl (methacrylate, diallylmethacrylate; the epoxyacrylate, aminoplast acrylate, as well as many others such as unsaturated polyesters, urethanes, etc., vinyl acetate, vinyl and vinylidene halides and amides, butadiene, styrene, vinyl toluene, and so forth are also included.

The adhesion characteristics are not affected adversely when pigmentary and other filler additives are incorporated into the U.V. curable composition. In this respect, the rapid cure of the material is important and such can be accomplished by many known photosensitizers for this purpose. Of particular note are the sensitizers whose effectiveness is not reduced (masked) seriously by the pigment present. In this connection, see U.S. Pat. Nos. 3,827,956, 3,827,957, 3,827,958, 3,827,959, 3,827,960, all of which are assigned to the same assignee as the present invention wherein the photosensitizers described show excellent photoinitiation characteristics even in the presence of 50% pigment. The disclosures of the foregoing patents are incorporated herein by reference.

In order that the present invention is better understood, the following examples are provided herein to illustrate the invention and particularly the adhesion characteristics of the U.V. curable material. In the examples are parts by weight, all percentages are weight percentages, and all temperatures are in degrees Fahrenheit unless specifically stated otherwise.

ADHESION TEST

Paint films hereinafter described were applied to flat sheet metal substrates and cured with ultraviolet light. After application, the coated metal was placed onto a moving conveyer line and exposed to U.V. radiation from an Ashdee Unit source (2 lamps of 2,000 watts each) placed 5 to 7 inches from the coating. Exposure time was 9 seconds. (Line speeds of 50 to 100 Ft. per minute.)

Adhesion tests vary considerably depending on the type of coating being tested. By and large, the cellophane tape test is quite common, wherein a piece of adhesive cellophane tape is pressed on an area of the coating which had been scratched, scored or otherwise cut with a sharp edge. The severity of the test depends on how the scratching is done on the coating and in what geometrical shape. For example, a straight scratch on which the cellophane is pressed and quickly pulled will show mild adhesion properties even when no coating is pulled off with the tape. Conversely, when the tape is pressed on a scratch in the shape of X, and no coating is pulled off with the quick removal of the tape, the adhesion properties then are better. See U.S. Pat. No. 3,856,744 for adhesion test description.

In the present examples the adhesion properties are tested in a procedure believed to be quite severe. Here, the coating in the form of a film was cut into a grid of 1.0 cm × 1.0 cm area (100 mm²) onto which area a cellophane tape was pressed and pulled quickly. If no film was lifted off or pulled, the rating of 100% adhesion is given; if any part of the film was lifted, then the number of filled squares remaining will determine the extent of adhesion. Thus if 10 squares are pulled off, the adhesion is rated at 90%; if 25 squares are pulled off, then adhesion is 75%.

The results of the adhesion test for the present example showed 100% adhesion on repeated cellophane tape applications. Conversely, without the incorporation of solid thermoplastic polymer the adhesion was 0%. However, the latter paint composition (without the additive) showed 100% adhesion when the applied coating was heat cured in an oven at 300° F. for 15 minutes.

EXAMPLE 1

An ethylenically unsaturated binder polymer was prepared from the following components: 23 weight parts pentaerythritol triacrylate (PETA), 19 weight parts phenyl cellosolve acrylate (PCA). 1 weight part photosensitizer 2 chlorothioxanthone and 3 weight parts methyl diethanol amine. The binder (46 weight parts) was pigmented with 38 weight parts of rutile $TiO_2$ and then combined with high Tg polymeric additives as set forth hereinafter.

EXAMPLE 2

The binder polymer of Example 1 was combined with 19 weight parts of solid high Tg polymer prepared from 4.6 moles of hexahydrophthalic anhydride reacted with 0.7 mole of neopentylglycol, 3.9 moles of hydrogenated bisphenol-A, and 1 mole of glycidyl acrylate. This thermosetting solid polymer additive showed no blocking (cold flow) at 135° F. and the glass transition temperature was estimated to be above 60° C.

The resin mixture of binder (Example 1) and high $T_g$ polymer (Example 2) was applied to a metal substrate and tested for adhesion. Adhesion was found to be 100%.

EXAMPLE 3

For comparison, a low $T_g$ polymer additive was produced from 370 grams of Dow Epoxy Resin DER 332 (liquid resin comprising diglycidyl ether of bisphenol-A) reacted with 1 mole (72.1 g.) of acrylic acid. The polymer was a low $T_g$ polymer and had the following physical properties: $T_m$=fluent at room temperature; Tg less than 20° C. This polymer additive (19 weight parts) was combined with the binder pigment mixture of Example 1.

The adhesion test showed 0% adhesion because all squares of the grid were removed by the tape and was in direct contrast to the excellent adhesion obtained with the high $T_g$ polymer additive of Example 2.

EXAMPLE 4

In the manner similar to Example 3, a low $T_g$ polymer additive consisting of 370 grams of Dow Epoxy Resin DER 332 (liquid resin comprising diglycidyl ether of bisphenol (A) reacted with 1 mole (86.1 g.) of methacrylic acid) was added to the binder and pigment mixture of Example 1. The properties of the additive were: $T_m$=fluent at room temperature; $T_g$ below 20° C. Again, adhesion was very poor showing 0% with the cellophane tape test.

EXAMPLE 5

A high $T_g$ polymer additive was prepared from reacting 370 grams of DER 332 resin with 1 mole (227 g.) of benzoylbenzoic acid and 1 mole (86.1 g.) of methacrylic acid. $T_m$ of the high Tg polymer was measured about 78° F. and the $T_g$ was 70° F. The pigmented coating including 19 parts of this high $T_g$ polymer combined with the binder and pigment mixture of Example 1 was applied to sheet metal and cured in the same manner described earlier. On applying the adhesion test, 50% of the squares in the cellophane tape were filled with paint, and adhesion therefore was 50%. The improvement over Examples 2 and 3 resided primarily on the nature of $T_m$ or $T_g$ of the polymer additive.

EXAMPLE 6

A polymer additive was prepared from an epoxy resin (Dow DER 664 Resin--marketed as the reaction product of Dow DER 332 and additional bisphenol-A) reacted with and 1 mole of acrylic acid. This additive was solid at room temperature $T_m$=58° C. and its $T_g$=58° C. The high $T_g$ additive was incorporated with the other components of Example 1 to form the desired pigmented coating. The film provided 100% adhesion to metal as measured by the adhesion test described earlier. This coating system showed 50 MEK rubssolvent resistance and excellent mar resistance.

EXAMPLE 7

A solid high $T_g$ additive which did not contain a pendant double was combined with the binder and pigment composition of Example 1. About 19 weight parts (600 grams) of DER 664 was added to the binder composition. The paint film produced 80% adhesion to metal but had negligible solvent resistance (5 MEK rubs) and poor wear resistance.

EXAMPLE 8

Many high Tg polymer additives were combined with binders in the manner hereinbefore described. The range of high Tg polymer additions was 10% to 40% by weight. Coating compositions having high Tg polymeric additives without a pendant double bond showed good adhesion to metal but exhibited poor solvent and mar resistance. In contrast, coating compositions having a high Tg polymer additive containing one pendant acrylic unsaturated double bond exhibited both excellent adhesion and excellent solvent and mar resistance. In further contrast, coating compositions containing a high Tg polymer additive having disubstituted acrylic unsaturation exhibited poor adhesion. Hence, low Tg polymer additives and/or diacrylate polymeric additives impart poor adhesion.

Polymeric additives are described in the following Tables and test results are indicated at the bottom of each Table.

TABLE 4

The monomers herein indicated are acrylic monomers identified as methylmethacrylate (MMA), methylacrylate (MA), ethylacrylate (EA), isobutylacrylate (IBA), ethylmethyacrylate (EMA), butylmethacrylate (BMA), isobornyl methacrylate (IMA), and dimethylaminoethyl methacrylate (DMAEMA).

Table 1

| Monomers | (polymer additives) | | | | |
|---|---|---|---|---|---|
| | a | b | c | d | e |
| tetrachlorophthalic anhydride | 2 moles | 2 moles | 2 moles | 2 moles | 2 moles |
| polypropylene glycol (Union Carbide 1025) | 1 mole | | 1 mole | | |
| Neopentyl glycol | | 1 mole | | 1 mole | 1 mole |
| Glycidyl acrylate | | | 1 mole | 1 mole | 2 moles |
| T(g), glass transition | 25° C. | above 25° C. | 25° C. | above 25° C. | above 25° C. |
| Adhesion | 0% | 100% | 0% | 90–100% | 30–50% |
| Solvent Resistance (MEK rubs) | 5–10 | 5–10 | 15–20 | 50 | 100 |
| Mar resistance | poor | poor | good | excellent | excellent |

TABLE 2

| Monomers | Polyester Polymer Additives | | | | | | |
|---|---|---|---|---|---|---|---|
| | a | b | c | d | e | f | g |
| Isophthalic Anhydride | 3 moles | | | | | | |
| Hexa-Hydro-Phthalic Anhydride | | 3 moles | 4 moles | 6.39 moles | 3.6 moles | 4 moles | 1 mole |
| Adipic Acid | 0.6 moles | 0.6 moles | 0.8 moles | | | | |
| Hydrogenated Bisphenol-A | 4 moles | 4 moles | | | 4 moles | 5 moles | 2 moles |
| Cyclohexane Dimethanol | | | 5 moles | | | | |
| Neo-Pentyl Glycol | 0.6 moles | 0.6 moles | 0.8 moles | 5.1 moles | 0.6 moles | | |
| Acid Number (final) | 24 | 15 | 7.5 | 85 | 22.4 | 18 | 9.6 |
| % OH (final) | 0.2 | 1.6 | 2.2 | 0.2 | 1.0 | 1.3 | 4.2 |
| M wt. (calculated) | 3727 | 1654 | 1401 | 1220 | 2075 | 1852 | 757 |
| $T_g C°$ low value | 58 | 53 | −5 | 23 | 64 | 76 | 57 |
| high value | 72 | 65 | 1 | 27 | 71 | 83 | 67 |
| Adhesion | 100% | 100% | 0% | 50% | 100% | 100% | 100% |

TABLE 3

| Monomers | Polyester Polymer Additives | | | | | | | | | | |
|---|---|---|---|---|---|---|---|---|---|---|---|
| | a | b | c | d | e | f | g | h | i | j | k |
| DER 661 | 1 mole | | | | | | | | 1 mole | | 1 mole |
| DER 664 | | 1 mole | | | | | | | | | |
| DER 332 | | | 1 mole | | 1 mole | 1 mole | 1 mole | | | 1 mole | |
| DEN 438 | | | | 1 mole | | | | 1 mole | | 1 mole | |
| acrylic acid | | | | | | | | | 1 mole | | 2 moles |
| Benzoic acid | (2 moles) | | | | 2 moles | | | 2.2 moles | | | |
| Benzophenone-2-Carboxylic Acid | | | | | | 2 moles | | | | | |
| 2-hydroxy-5-chlorobenzophenone | | | | | | | 2 moles | | | | |
| Acid Number | (0) | 0 | 0 | 0 | 0 | 1–2 | 1–2 | 3–4 | | | |
| Tg | above 25° C. | above 25° C. | below 25° C. | below 25° C. | below 25° C. | above 25° C. | below 25° C. | above 25° C. | above 25° C. | below 25° C. | above 25° C. |
| Adhesion | 100% | 100% | 0% | 0% | 100% | 100% | 20% | 100% | 100% | 0% | 50% |
| solvent resistance | 10 rubs | 10 rubs | | | | | | | 50 rubs | | good |
| Mar resistance | poor | poor | | | | | | | excellent | | good |

TABLE 4

| | SATURATED ACRYLIC RESINS | | | | | | | | | |
|---|---|---|---|---|---|---|---|---|---|---|
| POLYMER | MMA* | MA* | EA* | IBA* | EMA* | BMA* | IMA* | DMAEMA* | $T_g$° C. | ADHESION |
| 1 | 100 | | | | | | | | 8 | 0 |
| 2 | | 100 | | | | | | | −20 | 0 |
| 3 | | | 100 | | | | | | −45 | 0 |
| 4 | | | | 100 | | | | | 65 | 100 |

TABLE 4-continued

| POLYMER | SATURATED ACRYLIC RESINS | | | | | | | | $T_g$° C. | ADHESION |
|---|---|---|---|---|---|---|---|---|---|---|
| | MMA* | MA* | EA* | IBA* | EMA* | BMA* | IMA* | DMAEMA* | | |
| 5 | | | | 100 | | | | | 20 | 50 |
| 6 | | | | | | 100 | | | 176 | 100 |
| 7 | | | | | | | 100 | | 18 | 20 |
| 8 | | | | | | 50 | 50 | | 30 | 100 |
| 9 | | | 50 | 50 | | | | | 14 | 0 |
| 10 | 20 | | | | | 80 | | | 71 | 100 |
| 11 | 35 | | | | | 65 | | | 65 | 100 |
| 12 | 50 | | | | | 50 | | | 68 | 100 |
| 13 | 65 | | | | | 35 | | | 60 | 100 |

TABLE 5

Modification of the acrylic resins additives in Table 4 with acrylic or methacrylic acid (MMA) further reacted with glycidyl acrylate or glycidyl methacrylate (GMA) to the extent of providing high levels of double bond unsaturation (35%–55%) provides poor adhesion even though the polymeric additive is a high Tg polymer.

| MMA | EA | MMA | IMA | GMA | Tg | ADHESION | MEK | MAR |
|---|---|---|---|---|---|---|---|---|
| 20 | | 45 | 35 | 45 | 60° C. | 0% | 100 rubs | good |
| | 100 | | | | −20° C. | 0% | 5–10 rubs | poor |
| | | 90 | 10 | 10 | 0° C. | 0% | 25 rubs | poor |

TABLE 6

SATURATED ACRYLIC RESIN ADDITIVES

| MONOMERS | | | | | | |
|---|---|---|---|---|---|---|
| Methyl methacrylate | 100% | | | | | |
| Styrene | | 100% | | | | |
| Isobutyl methacrylate | | | 100% | | | |
| Butyl Acrylate | | | | 100% | | |
| Hydroxyethyl Methacrylate | | | | | 100% | |
| 2-Ethylhexyl Acrylate | | | | | | 100% |
| $T_g$ | 105° C. | 110° C. | 50° C. | −55° C. | 55° C. | −112° |
| Adhesion | 100% | 100% | 100% | 0% | 100% | 0% |
| Solvent resistance | poor | poor | poor | | poor | |
| Mar resistance | poor | poor | poor | | poor | |

TABLE 7

URETHANE RESIN ADDITIVES

| MONOMERS | Polymer 1 | Polymer 2 | Polymer 3 | Polymer 4 | Polymer 5 |
|---|---|---|---|---|---|
| Toluene Di-isocyanate | 1 mole | 1 mole | | | 3 mole |
| Iso-Phorone Di-isocyanate | | | 1 mole | 1 mole | |
| Hydrogenated Bisphenol-A | 2 mole | | 2 moles | | 2 moles |
| Polypropylene glycol M. wt. 300 | | 2 moles | | 2 moles | |
| Hydroxyethyl acrylate | | | | | 1 mole |
| $T_g$ or T melt | above 25° C. | below 25° C. | above 25° C. | below 25° C. | above 30° C. |
| Adhesion | 100% | 0% | 100% | 0% | 100% |
| Solvent resistance (MEK rubs) | 10 | 5 | 10 | 5 | 50 |
| Mar resistance | poor | poor | poor | poor | excellent |

EXAMPLE 9

To the coating compositions described in the preceding Examples, paint compositions without UV utilizing ionizing radiation (electron beam). Ionizing radiation is sufficiently powerful to cure or crosslink ethylenic unsaturation without the need of photosensitizer. The cure is effected so rapidly that shrinkage of the film (or coating) is more noticeable than when U.V. radiation is utilized. Thus adhesion problems were exaggerated for prior art compositions and heat was often used to effect adhesion.

By using the high $T_g$ polymer additive of this invention, excellent adhesion to metal was obtained when electron beam was the radiation means. The coating compositions were applied onto a metal sheet substrate and subjected to electron beam from an Energy Science Electrocurtain (150 KV terminal voltage and $3.5 \times 10^{-6}$ torr vacuum). Each metal sheet was mounted on a moving line of speeds varying from 10 to 40 feet per minute. The dosage was 10 to 3 M rads at 10 M amps current. Testing for adhesion the test described hereinabove gave 100% at all line speeds between 10 and 40 feet per minute.

We claim:

1. In a process for radiation curing a coating applied onto a metal substrate and subjected to a source of radiation wherein said coating composition comprises an ethylenically unsaturated polymerizable binder pigment, and 0 to 10% by weight of a photoinitiator, the improvement comprising:

incorporating in said coating composition a high $T_g$ polymer additive having a glass transition temperature ($T_g$) greater than ambient curing temperature and added to the coating in the range of 10% to 40% by weight based on the weight of said coating, said high $T_g$ polymer additive being substantially a linear polymer having a free end chain and pendant double bond and having a molecular weight of between about 1,000 and 50,000 whereby said high $T_g$ polymer additive crosslinks with said binder upon exposure to said radiation and provides adhesion of said coating composition to the metal substrate.

2. The process in claim 1 wherein the radiation source is ultraviolet energy.

3. The process in claim 1 wherein the radiation source is ionizing radiation from an electron beam.

* * * * *